United States Patent

Kurasawa

[11] 4,321,905
[45] Mar. 30, 1982

[54] DIESEL ENGINE FUEL SYSTEM
[75] Inventor: Jiro Kurasawa, Yokohama, Japan
[73] Assignee: Showa Line Ltd., Tokyo, Japan
[21] Appl. No.: 65,547
[22] Filed: Aug. 10, 1979
[51] Int. Cl.³ ............................................. F02M 1/16
[52] U.S. Cl. .................................... 123/575; 123/576
[58] Field of Search ............... 123/575, 576, 577, 1 A, 123/304

[56] References Cited
U.S. PATENT DOCUMENTS

| | | | |
|---|---|---|---|
| 1,308,917 | 7/1919 | Ricketts | 123/575 |
| 1,346,477 | 7/1920 | Anderson | 123/575 |
| 2,059,334 | 11/1936 | Gustafsson | 123/575 |
| 2,311,828 | 2/1943 | Hansen | 123/575 |
| 2,758,579 | 8/1956 | Pinotti | 123/577 |
| 2,793,629 | 5/1957 | Neely | 123/576 |
| 2,865,355 | 12/1958 | Hilton | 123/577 |
| 2,984,229 | 5/1961 | Vaughan | 123/577 |
| 3,022,425 | 2/1962 | Rockstead | 123/577 |

Primary Examiner—Ronald H. Lazarus
Attorney, Agent, or Firm—Koda and Androlia

[57] ABSTRACT

A fuel system having an overhead tank for gravity feeding marine diesel oil to an engine and a pump for feeding heavy fuel oil to the engine, a mixer connected to the outlet of the tank and the pump and to the inlet of the engine and a flow control valve provided for regulating the flow of the heavy fuel oil whereby the fuel oils become mixed fuel oil and then flow into the engine.

1 Claim, 3 Drawing Figures

DIESEL ENGINE FUEL SYSTEM

BACKGROUND OF THE INVENTION

1. Field of the Invention

This invention relates to an improved diesel-engine fuel system and, more specifically, relates to a mixed-fuel supply system.

2. Prior Art

For operation of large-sized diesel engines, such as for electrical generation in ships, heavy fuel oil is not suitable, but marine diesel oil is too good and too expensive. Therefore, it is more economical to supply this type of engine with a mixed fuel oil of these two fuels.

Various types of mixed-fuel have now been proposed including systems having two variable-delivery feed pumps, one for marine diesel oil and the other for heavy fuel oil, a mixer and a tank from which mixed oil is fed to the engine. However, these existing systems have the disadvantage that the failure of the marine diesel oil pump will cause the supply of pure heavy fuel oil to the engine, and thus serious damage thereto may follow. Another disadvantage is that the storage of mixed fuel in the tank produces a considerable amount of sludge therein.

SUMMARY OF THE INVENTION

In accordance with the present invention there is provided a fuel system having an overhead tank for gravity feeding higher-grade fuel oil such as marine diesel oil to an engine, a pump for feeding a lower-grade fuel oil such as heavy fuel oil to the engine and a flow control valve for regulating the flow of the lower-grade fuel oil. A mixer is connected to the outlet of the tank and the pump, and to the inlet of the engine. This arrangement eliminates the need for a mixed-oil tank. Therefore, the mixed fuel oil is directly sent to the engine, as a result, the direct feed prevents sludge formation. The overhead tank permits gravity feed of the higher-grade fuel oil to the engine, which insures safe operation of the engine in the event of a pump failure. The flow control valve allows the ratio between their flow rates to be adjusted freely.

The flow control valve is preferably provided with a feedback control, which maintains the flow ratio at the desired value under various conditions.

The mixer, in a preferred embodiment, consists of a tubular housing forming a fluid passage and stationary mixing elements therein. This type of mixer provides greater reliability to the system because of not having moving parts.

BRIEF DESCRIPTION OF THE DRAWINGS

While the invention is particularly pointed out and distinctly claimed in a concluding portion of the specification, a preferred embodiment is set forth in the following detailed description which may be best understood when read in connection with the following drawings, in which:

DETAILED DESCRIPTION OF THE INVENTION

Figure 1:
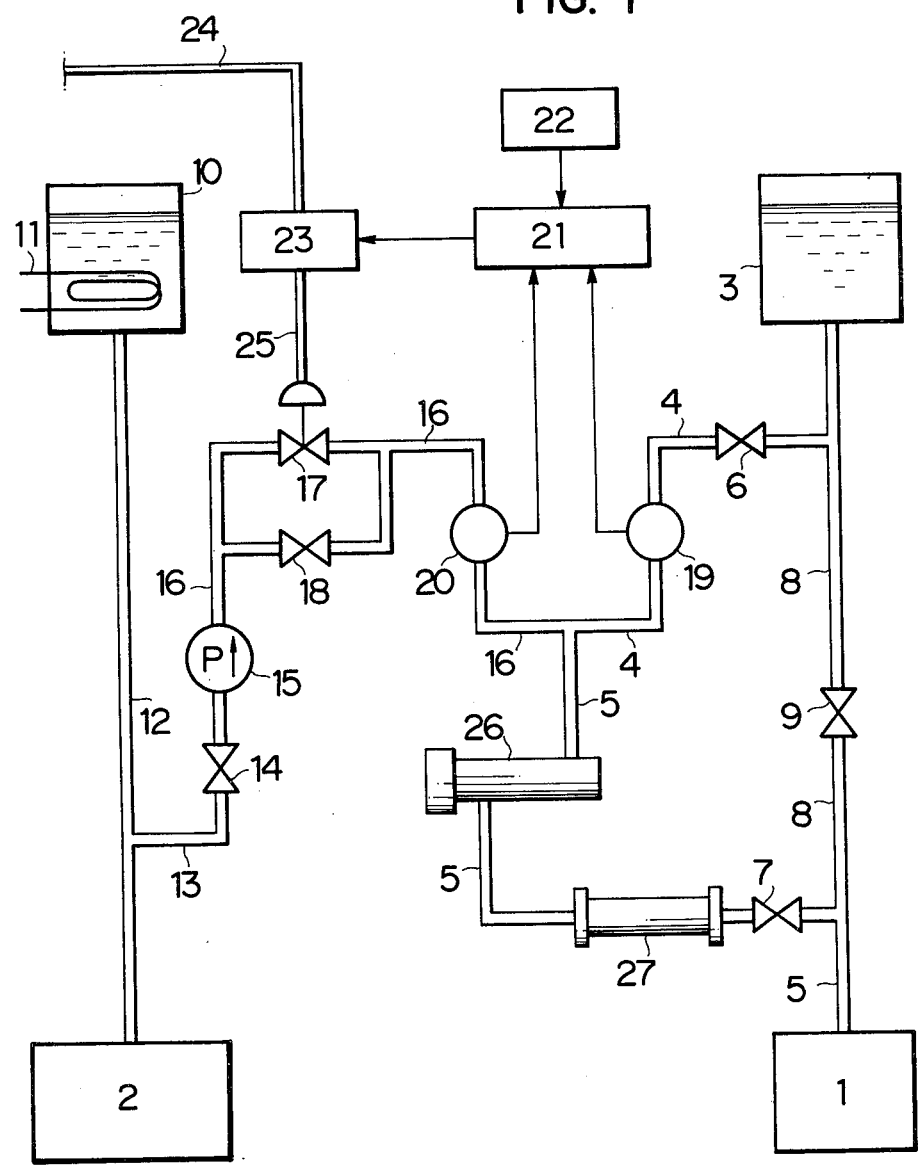
FIG. 1 is a schematic diagram of a fuel system according to the present invention.

Referring now to the drawings, in FIG. 1, there is shown a mixed-fuel supply system for a diesel engine 1, which is a prime mover for electrical generation and placed in a machinery space of a ship with a main engine 2 for propulsion.

An overhead tank 3 is mounted above the engine, and contains marine diesel oil pumped thereto from a main tank (not shown). The bottom of the tank 3 is connected to the fuel inlet of the engine 1 by both pipes 4 and 5 with valves 6 and 7 and a pipe 8 with a valve 9. Normally, the valves 6 and 7 are kept open and the valve 9 closed. The pipe 8 is used to send marine diesel oil directly to the engine 1, as in starting the engine.

An overhead tank 10 mounted higher than the main engine 2 contains heavy fuel oil pumped thereto from a main tank (not shown). The tank 10 is provided with a steam-heating coil 11 therein for reducing the viscosity of the heavy fuel oil. The tank 10 is connected by a pipe 12 to the fuel inlet of the main engine 2, to which the heavy fuel oil flows down under the action of gravity.

A pipe 13 branching off from the pipe 12 leads through a valve 14 into a centrifugal pump 15, the discharge side of which is connected to the pipe 5 by a pipe 16.

Flow control valves 17 and 18 are connected in parallel on the pipe 16. The valve 18 is for emergency use, and normally is kept closed. The valve 17 is of the air driven type, and is provided with a feedback control, which consists of flow transmitters 19 and 20, controlling circuit 21 with a mixing-ratio setter 22, and a pressure converter 23. The flow rates of the fuels in the pipes 4 and 16 are measured by the flow transmitters 19 and 20, and fed back to the controlling circuit 21. The circuit 21 compares the ratio between the measured flow rates with the set point (desired value) inputted by the mixing-ratio setter 22, and delivers a control signal. According to the strength of the signal, the converter 23 controls the pressure of compressed air sent through a pipe 24, and this controlled air is applied to the diaphragm of the valve 17 through a pipe 25. The valve 17 therefore, is actuated in such a manner that the flow ratio is at the desired value under various conditions. The above-described elements and the controlling circuit 21 may be elements and circuits found in the prior art.

An oil heater 26 for reducing the viscosity of the fuel oil and a mixer 27 are on the pipe 5.

Figure 2:
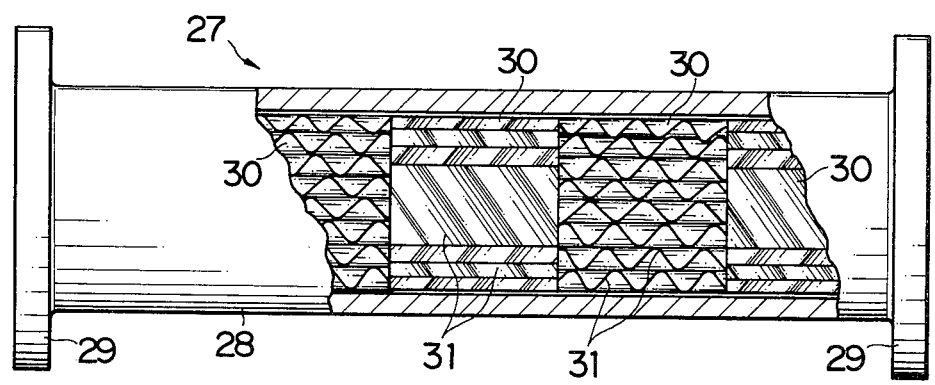
FIG. 2 is a partially cutaway view of a mixer incorporated in the system shown in FIG. 1.
Figure 3:
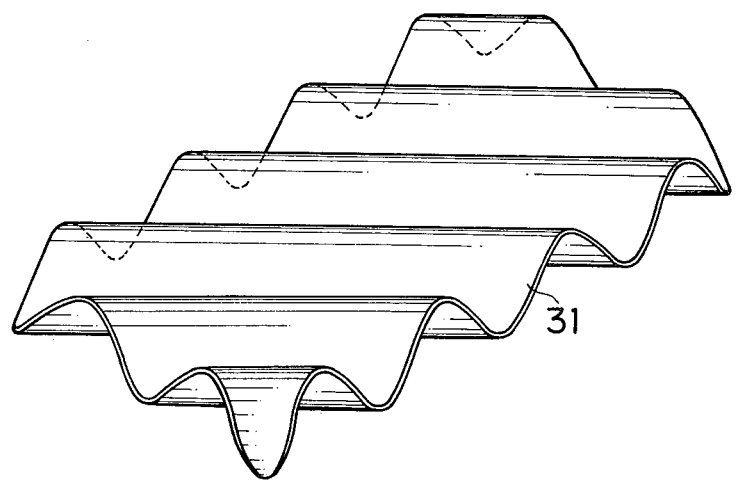
FIG. 3 is an enlarged isometric view of one component of the mixer shown in FIG. 2.

The mixer 27, in the preferred embodiment, includes a tubular housing 28 (partially broken away in FIG. 2) forming a fluid passage with annular coupling flanges 29 at each end and a plurality of stationary mixing elements 30 therein. Each of the mixing elements is made up of a plurality of corrugated sheets 31 of metal stacked rigidly with their ridges at right angles to one another. The tortuous paths formed between the sheets 31 produce turbulent flow of fluid. The mixing elements 30 are placed in the housing with their sheets 31 at right angles to one another, so that as a result divisions of the fluid take place at the upstream end of each of the mixing elements. Thus, by this division and the formation of the turbulent flow the fuel oils passing through the mixer are turned into a homogeneously mixed oil.

In operation, the marine diesel oil in the overhead tank 3 flows down under the action of gravity through the pipes 4 and 5 into the engine 1. The pump 15 sends the heavy fuel oil from the tank 10 through the pipes 12, 13, 16 and 5 to engine 1. On the way to the engine, the fuel oils meet in the pipe 5 and flow together through the oil heater 26 and the mixer 27, both of which turn them into a homogeneous mixed fuel oil with suitable viscosity. This mixed fuel oil flows into the engine 1 and is burned. The mixing ratio of the mixed fuel oil is maintained at the desired value by the flow control valve 17 with a feedback control.

Although what has been described herein is a preferred embodiment of the present invention, it is, of course, to be understood that various modifications and changes may be made therein without departing from the invention. It is, therefore, intended to cover in the following claims all such modifications and changes as may fall within the true spirit and scope of the present invention.

I claim:

1. A fuel system for feeding a homogeneous mix of higher-grade and lower-grade fuel oils to a diesel engine, comprising:

a tank mounted higher than the engine so as to permit the gravity feed of higher-grade fuel oil contained therein to the engine;

a pump for feeding lower-grade fuel oil from a source to the engine;

means for mixing the different types of said fuel oils together into a homogeneous fuel mixture, the inlet of which is connected to both said tank and the discharge side of said pump, the outlet to said engine, said mixing means comprising a tubular housing forming a fluid passage and a plurality of stationary mixing elements therein for dividing and mixing the fluid flowing through said passage, wherein each of said mixing elements is made up of a plurality of corrugated sheets stacked rigidly with their ridges at right angles to one another, and wherein said plurality of mixing elements are disposed in series with the stacks of said corrugated sheets of adjacent elements being oriented at right angles to each other; and means for regulating the flow of said lower-grade fuel oil to said mixing means relative to the flow of said higher-grade fuel oil.

* * * * *